(12) United States Patent
Katou et al.

(10) Patent No.: US 10,603,880 B2
(45) Date of Patent: Mar. 31, 2020

(54) MULTI-LAYER DIRECT BLOW BOTTLE AND PRODUCTION PROCESS THEREFOR

(71) Applicants: Toyo Seikan Co., Ltd., Tokyo (JP); TOYO ALUMINIUM KABUSHIKI KAISHA, Osaka-shi, Osaka (JP)

(72) Inventors: Yuuichirou Katou, Yokohama (JP); Yusuke Anzai, Yokohama (JP); Tetsuya Fudaba, Osaka (JP); Akihiko Ikeya, Osaka (JP); Satomi Ozawa, Yokohama (JP)

(73) Assignees: TOYO SEIKAN CO., LTD., Tokyo (JP); TOYO ALUMINUM KABUSHIKI KAISHA, Osaka (JP)

( * ) Notice: Subject to any disclaimer, the term of this patent is extended or adjusted under 35 U.S.C. 154(b) by 413 days.

(21) Appl. No.: 15/501,007

(22) PCT Filed: Aug. 26, 2015

(86) PCT No.: PCT/JP2015/073963
§ 371 (c)(1),
(2) Date: Feb. 1, 2017

(87) PCT Pub. No.: WO2016/031846
PCT Pub. Date: Mar. 3, 2016

(65) Prior Publication Data
US 2017/0217141 A1    Aug. 3, 2017

(30) Foreign Application Priority Data

Aug. 27, 2014 (JP) .................. 2014-172762

(51) Int. Cl.
*B32B 27/20* (2006.01)
*B29C 49/04* (2006.01)
(Continued)

(52) U.S. Cl.
CPC .......... *B32B 27/20* (2013.01); *B29C 49/0005* (2013.01); *B29C 49/04* (2013.01);
(Continued)

(58) Field of Classification Search
CPC ... B32B 27/20; B32B 27/32; B32B 2264/105; B32B 2323/04; B32B 2439/60;
(Continued)

(56) References Cited

U.S. PATENT DOCUMENTS 8,513,344 B2    8/2013  Asano et al.
2004/0022976 A1  2/2004  Kato et al.
(Continued)

FOREIGN PATENT DOCUMENTS

CN    1407935 A    4/2003
CN    101390111 A   3/2009
(Continued)

OTHER PUBLICATIONS

English machine translation of JP2003335315, Nov. 25, 2003.*
(Continued)

*Primary Examiner* — Michael C Miggins
(74) *Attorney, Agent, or Firm* — Sughrue Mion, PLLC

(57) ABSTRACT

A multi-layer direct blow bottle in which a metallic layer containing a metal pigment having an average thickness of not more than 1 μm dispersed in a resin is formed at a position where it is visible from the outer surface side.

6 Claims, 1 Drawing Sheet

(51) Int. Cl.
| | |
|---|---|
| *B29C 49/22* | (2006.01) |
| *B65D 1/02* | (2006.01) |
| *B65D 23/00* | (2006.01) |
| *B29C 49/00* | (2006.01) |
| *B32B 27/32* | (2006.01) |
| *B29L 9/00* | (2006.01) |
| *B29C 48/00* | (2019.01) |
| *B29C 48/21* | (2019.01) |
| *B29C 48/285* | (2019.01) |
| *B29K 23/00* | (2006.01) |
| *B29K 105/00* | (2006.01) |
| *B29K 105/16* | (2006.01) |
| *B29K 505/02* | (2006.01) |
| *B29L 31/00* | (2006.01) |

(52) U.S. Cl.
CPC .............. *B29C 49/22* (2013.01); *B32B 27/32* (2013.01); *B65D 1/02* (2013.01); *B65D 1/0215* (2013.01); *B65D 23/00* (2013.01); *B29C 48/0017* (2019.02); *B29C 48/21* (2019.02); *B29C 48/297* (2019.02); *B29C 2049/001* (2013.01); *B29K 2023/0625* (2013.01); *B29K 2105/0032* (2013.01); *B29K 2105/16* (2013.01); *B29K 2105/258* (2013.01); *B29K 2505/02* (2013.01); *B29K 2995/0002* (2013.01); *B29K 2995/0026* (2013.01); *B29L 2009/00* (2013.01); *B29L 2009/003* (2013.01); *B29L 2031/7158* (2013.01); *B32B 2264/105* (2013.01); *B32B 2323/04* (2013.01); *B32B 2439/60* (2013.01)

(58) Field of Classification Search
CPC ....... B29C 49/04; B29C 49/22; B29C 48/297; B29C 48/0017; B29C 48/21; B29C 2049/001; B29C 49/0005; B65D 23/00; B65D 1/02; B65D 1/0215; B29K 2023/0625; B29K 2105/0032; B29K 2105/16; B29K 2105/258; B29K 2505/02; B29K 2995/0026; B29K 2995/0002; B29L 2009/00; B29L 2031/7158; B29L 2009/003
See application file for complete search history.

(56) References Cited

U.S. PATENT DOCUMENTS

| | | | |
|---|---|---|---|
| 2010/0219252 | A1 | 9/2010 | Kikuchi et al. |
| 2010/0292067 | A1 | 11/2010 | Nakamura |

FOREIGN PATENT DOCUMENTS

| | | | |
|---|---|---|---|
| EP | 2 479 119 | A1 | 7/2012 |
| EP | 2 837 573 | A1 | 2/2015 |
| JP | 4-14429 | A | 1/1992 |
| JP | 6-11650 | A | 1/1994 |
| JP | 6-116507 | A | 4/1994 |
| JP | 6-239350 | A | 8/1994 |
| JP | 10-245026 | A | 9/1998 |
| JP | 2000-178478 | A | 6/2000 |
| JP | 2001-341240 | A | 12/2001 |
| JP | 2002-263567 | A | 9/2002 |
| JP | 2003-063543 | A | 3/2003 |
| JP | 2003-335315 | A | 11/2003 |
| JP | 2004-067244 | A | 3/2004 |
| JP | 2004-091041 | A | 3/2004 |
| JP | 2006-95522 | A | 4/2006 |
| JP | 2006-312485 | A | 11/2006 |
| JP | 4210901 | B2 | 1/2009 |
| JP | 2010-121092 | A | 6/2010 |
| JP | 2012-148811 | A | 8/2012 |
| JP | 2014-065527 | A | 4/2014 |
| WO | 2009/044884 | A1 | 4/2009 |

OTHER PUBLICATIONS

International Search Report for PCT/JP2015/073963 dated Nov. 17, 2015.
Communication dated Dec. 11, 2018, from the State Intellectual Property Office of People's Republic of China in counterpart Application No. 201580040129.8.
Communication dated Jun. 13, 2017 from the Japanese Patent Office in counterpart Application No. 2016-545569.
Communication dated Dec. 7, 2017 from the European Patent Office in counterpart application No. 15836497.6.

* cited by examiner

MULTI-LAYER DIRECT BLOW BOTTLE AND PRODUCTION PROCESS THEREFOR

CROSS REFERENCE TO RELATED APPLICATIONS

This application is a National Stage of International Application No. PCT/JP2015/073963 filed Aug. 26, 2015, claiming priority based on Japanese Patent Application No. 2014-172762 filed Aug. 27, 2014, the contents of all of which are incorporated herein by reference in their entirety.

TECHNICAL FIELD

The present invention relates to a metallic decorated multi-layer direct blow bottle and a production process therefor.

BACKGROUND ART

Since the walls of the barrel parts of direct blow bottles generally have such high flexibility that contents can be easily discharged by squeezing, the direct blow bottles are widely used as plastic containers for containing various contents such as foods, cosmetics and haircare products (for example, shampoo and rinse).

Although the metallic decoration of the appearances of plastic containers is adopted as means for enhancing the commodity value of the plastic containers, metallic decoration is limited to high price goods such as cosmetic containers.

That is, for the metallic decoration of the appearance of a plastic container, the coating film of a metal pigment is formed on the outer surface of a container by spray coating the metal pigment, or a shrink film is formed by gravure printing a metal pigment to cover the outer surface of a container therewith. These means require the step of coating each container and the step of carrying a treatment with the shrink film, resulting in a high cost. Therefore, metallic decoration cannot be substantially applied to for example inexpensive containers for haircare products.

As a matter of course, to carry out metallic decoration at a low cost, for example, Patent Document 1 proposes master batch system in which a bottle having a layer decorated with a metal pigment is formed by the direct blow molding of a resin for forming a container mixed with a master batch prepared by kneading a flaky metal pigment into a resin. This master batch system makes it possible to carry out metallic decoration at a lower cost than the aforementioned spray coating system and shrink film system. However, the metallic appearance is not satisfactory in this case, and it is desired to further enhance the metallic appearance.

Further, the aforementioned shrink film system has a disadvantage that the shape of a container is limited to a straight cylindrical shape or a shape close to it.

PRIOR ART DOCUMENTS

Patent Document

Patent Document 1: JP-A 2010-121092

DISCLOSURE OF THE INVENTION

Problem to be Solved by the Invention

It is therefore an object of the present invention to provide a multi-layer direct blow bottle which is decorated metallic by extremely inexpensive means and gives an excellent metallic appearance stably and a production process therefor.

It is another object of the present invention to provide a multi-layer direct blow bottle which is decorated metallic without limiting the barrel part thereof to a particular shape.

Means for Solving the Problem

According to the present invention, there is provided a multi-layer direct blow bottle in which a metallic layer containing a metal pigment having an average thickness of not more than 1 μm dispersed in a resin is formed at a position where it is visible from the outer surface side.

In the multi-layer direct blow bottle of the present invention, preferably,
(1) the above metallic layer is formed on an outer surface layer or under an outer surface transparent resin layer;
(2) the above metal pigment is dispersed in an amount of 0.5 to 30.0 parts by mass based on 100 parts by mass of the resin in the metallic layer;
(3) the above resin is metallocene-catalyzed linear low-density polyethylene;
(4) at least 20 mass % of the above metal pigment is a metal pigment having a thickness of not more than 100 nm; and
(5) the above metal pigment is an aluminum pigment.

According to the present invention, there is provided a process for producing a multi-layer direct blow bottle, comprising the steps of:
forming a tube-like preform by the co-extrusion of a resin composition comprising a metal pigment having an average thickness of not more than 1 μm dispersed therein; and
blowing a blow fluid while one end of the preform is closed to shape the preform into a bottle form,
wherein the resin composition comprising the metal pigment dispersed therein is prepared by mixing the metal pigment after the resin is plasticized.

Effect of the Invention

The metallic decoration of the multi-layer direct blow bottle of the present invention is carried out by forming a metallic layer containing a metal pigment at a position where the metallic layer is visible from the outer surface side, for example, a position on an outermost layer or under a transparent outermost layer. Since a metallic appearance is obtained without carrying out a post-treatment such as spray coating or a treatment with a shrink film after direct blow molding, this production process has a great advantage that it is very inexpensive.

That is, the multi-layer direct blow bottle of the present invention is effectively used for the packaging of not only expensive cosmetics but also low price products typified by haircare products such as shampoo and rinse and liquid detergents.

In the multi-layer direct blow bottle of the present invention, a very thin metal pigment having an average thickness of not more than 1 m is used as a pigment for providing a metallic appearance, thereby giving a high metallic appearance.

That is, it is assumed that the reason that a high metallic appearance is not obtained by the master batch system employed in Patent Document 1 is that the average thickness of a metal pigment is large, for example, larger than 1 μm. When the average thickness of pigment particles is larger than 1 μm and the pigment particles overlap with one another, a level difference between pigment particles becomes large, and the surface hardly becomes like a flat and smooth foil. Therefore, there occur more diffused reflection and less specular reflection with the result that a metallic appearance is impaired. However, since a very thin metal pigment having an average thickness of not more than 1 µm is used in the present invention, even when pigment particles overlap with one another, the level difference between pigment particles becomes small and the surface tends to become like a flat and smooth foil. As a result, there occur less diffused reflection and more specular reflection. In addition, the metal pigment is oriented in the extrusion direction when it is extruded into a bottle tube form. As a result, the multi-layer direct blow bottle of the present invention gives an excellent metallic appearance stably. In the present invention, it is demonstrated in Examples which will be described hereinafter that such a high metallic appearance is obtained.

MODE FOR CARRYING OUT THE INVENTION

In the present invention, the metallic layer containing a metal pigment having an average thickness of not more than 1 µm is formed at a position where it is visible from the outer surface side, whereby an especially high metallic appearance is provided to the multi-layer direct blow bottle of the present invention.

Figures 1A, 1B:
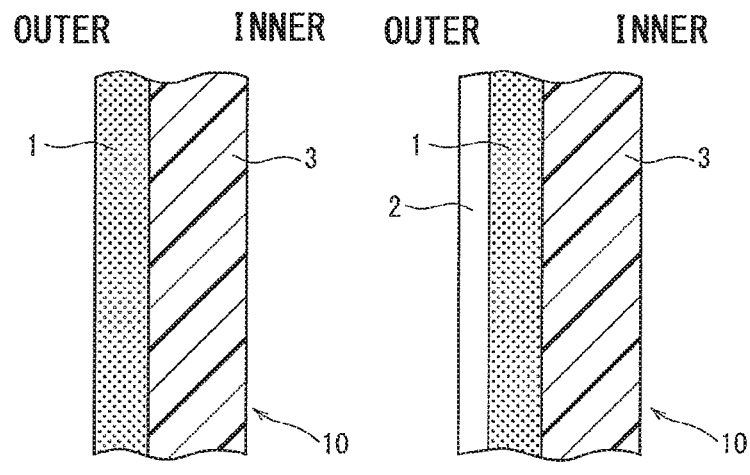
FIGS. 1A, 1B and 1C are schematic diagrams of examples of the layer structure of the multi-layer direct blow bottle of the present invention.
Figure 1C:
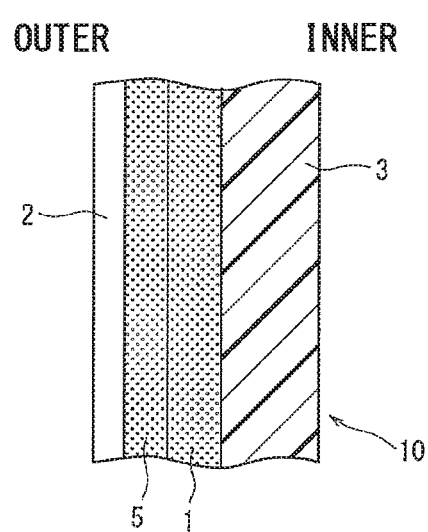

For example, with reference to FIGS. 1A, 1B and 1C which show the layer structures of the multi-layer direct blow bottle of the present invention, the above metallic layer is represented by numeral 1 in this bottle (represented by 10 as a whole). That is, in the mode of FIG. 1A, the metallic layer 1 containing a metal pigment dispersed therein is formed on the outer surface, and an inner layer 3 located on the inner surface side in contact with the content is formed adjacent to and under the metallic layer 1.

In the mode of FIG. 1B, a transparent resin layer 2 is formed on the outer surface, and the metallic layer 1 is formed under this transparent resin layer 2. Also in this mode, the inner layer 3 located on the inner surface side in contact with the content is formed adjacent to the metallic layer 1. Since this metallic layer 1 should be formed at a position where it is visible from the outer surface side, a pigment different from the pigment to be contained in the metallic layer 1 may be contained in the transparent resin layer 2 for decoration as long as the visibility of the metallic layer 1 is secured.

Further, as long as the visibility of the metallic layer 1 is secured, as shown in FIG. 1C, a decorative resin layer 5 obtained by mixing a pigment with a transparent resin may be formed between the transparent resin layer 2 on the outer surface and the metallic layer 1. The pigment to be contained in this decorative resin layer 5 differs from the pigment to be contained in the metallic layer 1 and may be, for example, a metal pigment having an average thickness of more than 1 µm (such as a pearl pigment). In all of these layer structures, the metallic layer 1 is formed adjacent to the inner layer 3 located on the inner surface side in contact with the content.

Thus, in all of the above modes, decoration with the metallic layer 1 is carried out.

<Metallic Layer 1>

In the present invention, the above metallic layer 1 contains a metal pigment dispersed in a base resin, and the metal pigment is oriented in an extrusion direction (height direction of the bottle 10) at the time of molding a preform for forming the bottle 10, thereby providing an excellent metallic appearance.

As the metal pigment, for example, aluminum pigments, copper pigments, copper zinc (brass) pigments, copper tin (bronze) pigments and luster pigments prepared by coating the surface of mica with aluminum, iron oxide or titanium oxide may be used as long as they develop metallic luster. From the viewpoint of metallic luster, aluminum pigments and aluminum luster pigments are preferred.

In the present invention, out of the above metal pigments, a very thin metal pigment having an average thickness of not more than 1 µm, preferably not more than 100 nm is used. That is, by using a metal pigment having a very small average thickness, when pigment particles overlap with one another, the level difference between pigment particles becomes small, and the surface tends to become like a flat and smooth foil. Therefore, there occur less diffused reflection and more specular reflection. At the same time, this metal pigment can be oriented uniformly in the extrusion direction by extrusion molding, thereby making it possible to provide an excellent metallic appearance.

For example, when a metal pigment having a larger average thickness than the above range is used and pigment particles overlap with one another, the level difference between pigment particles becomes large, and the surface hardly becomes like a flat and smooth foil. Therefore, there occur more diffused reflection and less specular reflection. As a result, metallic luster (metallic appearance) obtained by the metal pigment becomes unsatisfactory, and metallic decoration becomes unsatisfactory.

The particle diameter of the above metal pigment is generally 1 to 50 µm, particularly preferably 5 to 50 µm, and the aspect ratio (ratio of particle diameter to thickness: particle diameter (µm)/thickness (µm)) thereof is preferably 5 to 500. A flat metal pigment having a large particle diameter as compared with thickness has high directionality of reflected light when it is oriented, which is advantageous in providing a metallic appearance.

Further, there are deposited metal pigments obtained by vapor deposition and metal pigments obtained by flattening metal powders into flakes mechanically by using a ball mill. These metal pigments may be used alone or in combination in the present invention, and deposited metal pigments are particularly preferably used. That is, the deposited metal pigment is obtained by forming a deposited film by depositing a metal such as aluminum on a plastic film, taking off the plastic film from this deposited film, pulverizing the remaining deposited layer mechanically and dispersing the obtained powders into a dispersant. A metal pigment having a very small average thickness within the above preferred range (not more than 100 nm) is thus obtained. In general, the metal pigment obtained by flattening metal powders into flakes mechanically by using a ball mill has a large thickness of not less than 100 nm, and therefore the above deposited metal pigment is superior in terms of breakage resistance and deformation resistance at the time of extrusion molding.

In the present invention, the content of the above pigment is preferably at least 20 mass %, particularly preferably at least 30 mass % of the total of all the metal pigments in use.

In general, the aforementioned metal pigment is mixed with the base resin for forming the metallic layer while it is dispersed in a dispersant. A dispersant which enhances the dispersibility of the metal pigment in the base resin without impairing the extrusion moldability of the base resin is preferably used as the dispersant, as exemplified by hydrocarbon-based waxes such as polyethylene wax and polypropylene wax, and higher fatty acid waxes.

This dispersant is used in an amount of about 10 to 50 parts by mass based on 100 parts by mass of the metal pigment.

In the present invention, when this metal pigment is existent in the metallic layer 1 in an amount of preferably 0.5 to 30.0 parts by mass, more preferably 0.5 to 10.0 parts by mass, much more preferably 1.0 to 10.0 parts by mass based on 100 parts by mass of the base resin, an excellent metallic appearance is obtained advantageously.

The base resin forming the metallic layer 1 is not particularly limited if it is a thermoplastic resin which can be shaped into a bottle form by direct blow molding. In general, an olefin-based resin or polyester resin of an extrusion molding grade is advantageously used.

Examples of the olefin-based resin include polyethylenes such as low-density polyethylene (LDPE), middle-density polyethylene (MDPE), high-density polyethylene (HDPE), linear low-density polyethylene (LLDPE) and linear very low-density polyethylene (LVLDPE), polypropylene, ethylene-propylene copolymer, polybutene-1, ethylene-buten-1 copolymer, propylene-butene-1 copolymer, ethylene-propylene-butene-1 copolymer, ethylene-vinyl acetate copolymer and ion crosslinked olefin copolymers (ionomers). An amorphous to low-crystalline copolymer of a noncyclic olefin and a cyclic olefin (COC) may also be used as the base resin of the metallic layer 1.

Examples of the polyester resin include polyethylene terephthalate (PET), polybutylene terephthalate (PBT), polyethylene naphthalate (PEN) and amorphous polyester resin obtained by introducing a small amount of a copolyester unit into an ethylene terephthalate unit.

Examples of the comonomer for forming the above copolyester include dicarboxylic acid components such as isophthalic acid, p-β-oxyethoxybenzoic acid, naphthalene-2,6-dicarboxylic acid, diphenoxyethane-4,4'-dicarboxylic acid, 5-sodium sulfoisophthalic acid, adipic acid, sebacic acid and alkyl ester derivatives of these dicarboxylic acids; and glycol components such as propylene glycol, 1,4-butanediol, neopentyl glycol, 1,6-hexylene glycol, cyclohexane dimethanol, ethylene oxide adduct of bisphenol A, diethylene glycol and triethylene glycol.

An adhesive resin used for an adhesive resin layer which will be described hereinafter, that is, an ethylene-α-olefin copolymer or an acid modified resin thereof, a copolymer of an olefin and an acid, or a glycidyl group-containing polymer may also be used as the base resin of the metallic layer 1. A known tackifier may be added to these resins.

In the present invention, use of metallocene-catalized linear low-density polyethylene, especially metallocene-catalized linear low-density polyethylene into which a long branch is introduced, out of the above resins, as the base resin is preferred in order to orient the metal pigment and obtain an excellent metallic appearance (brightness).

In the present invention, when the metallic layer 1 is situated on the outer surface as shown in FIG. 1A, an olefin-based resin or an amorphous polyester resin is preferred as the base resin from the viewpoint of scratch resistance.

When the metallic layer 1 is situated under the transparent resin layer 2 forming the outer surface as shown in FIG. 1B, an olefin-based resin, polyester resin or adhesive resin is preferred as the base resin of the metallic layer 1.

The thickness of the barrel part of the metallic layer 1 which differs according to the size of the bottle and cannot be specified unconditionally is set to ensure that at least an excellent metallic appearance is obtained, for example, not less than 10 μm. <transparent resin layer 2>

In the present invention, when the metallic layer 1 is formed under the transparent resin layer 2 on the outer surface as shown in FIG. 1B, various resins which are able to be used for molding a direct blow bottle may be used as the transparent resin on condition that the resin has such high transparency that the metallic appearance of the underlying metallic layer 1 is not impaired. The aforementioned olefin-based resin or polyester resin is preferably used, and the olefin-based resin or amorphous polyester resin is particularly preferred from the viewpoints of scratch resistance and flexibility.

Although the thickness of the barrel part of this transparent resin layer 2 can be set to a suitable range according to the size of the direct blow bottle 10 and required flexibility and squeezability, it is generally set to about 10 to 200 μm.

Further, when the metallic layer 1 is formed under the transparent resin layer 2 on the outer surface as shown in FIG. 1B and adhesion between the transparent resin layer 2 and the metallic layer 1 is low, an adhesive resin layer may be interposed between them.

An adhesive resin used to form this adhesive resin layer is known per se, as exemplified by ethylene-α-olefin copolymer resins and acid modified resins thereof, copolymer resins of an olefin and an acid, and glycidyl group-containing resins. To improve adhesion, a known tackifier may be added to these resins.

Any copolymer may be used if it is manufactured by a random, block or graft copolymerization scheme. The acid modified resins include unsaturated carboxylic acids such as acrylic acid, methacrylic acid, maleic acid, fumaric acid, itaconic acid and crotonic acid, and resins which are graft modified with anhydrides thereof. These resins may be used alone, as a blend resin of two or more, or as a blend resin with another resin. Examples of the tackifier include rhodine-based resins, terpene-based resins and petroleum resins. These resins may be used alone or in combination of two or more.

Known additives may be added to the adhesive resin layer. The additives include a thermoplastic elastomer, another thermoplastic resin, rubber resin, inorganic filler, pigment, plasticizer, antioxidant, static agent, optical stabilizer and anti-blocking agent. A resin obtained by adding a tackifier to a polyolefin resin (especially a polyethylene-based resin) is preferred. A styrene-based elastomer is preferably used as the thermoplastic elastomer to suppress unevenness at the interface between layers.

The metallic appearance can be further enhanced by compounding a metal pigment listed in the paragraph for the metallic layer into the adhesive resin layer.

The thickness of the adhesive resin layer is set to ensure that suitable adhesive force is obtained, generally, 10 to 200 μm. <inner layer 3>

In the layer structures shown in FIG. 1A and FIG. 1B, a known thermoplastic resin used to mold this type of direct blow bottle, for example, the aforementioned olefin-based resin or polyester resin is used for the inner layer facing the inner surface.

This inner layer may have a multi-layer structure consisting of a plurality of resin layers. For example, a regrind layer may be formed as an intermediate layer by mixing scrap such as burrs generated at the time of molding the bottle 10 with a virgin resin on condition that the layer does not face the inner surface of the bottle 10.

Further, a gas barrier resin layer may be formed as the intermediate layer not facing the inner surface.

A gas barrier resin forming this gas barrier resin layer is typically a resin having an oxygen permeability coefficient at 37° C. and 0% RH of not more than $5.5 \times 10^{-12}$ cc·cm/cm²·sec·cmHg, such as an ethylene-vinyl alcohol copolymer or polyamide, particularly preferably an ethylene-vinyl alcohol copolymer.

As the ethylene-vinyl alcohol copolymer (ethylene-vinyl acetate copolymer saponified product), specifically, a copolymer saponified product obtained by saponifying an ethylene-vinyl acetate copolymer having an ethylene content of 20 to 60 mol %, specifically 25 to 50 mol % at a saponification ratio of not less than 96 mol %, specifically not less than 99 mol % is preferably used. This ethylene-vinyl alcohol copolymer (may be referred to as "EVOH" hereinafter) should have a molecular weight which is high enough to form a film and an intrinsic viscosity measured at 30° C. in a mixed solvent of phenol and water in a weight ratio of 85/15 of not less than 0.01 dl/g, specifically not less than 0.05 dl/g.

The above gas barrier resin layer may be formed by blending another thermoplastic resin with an oxygen barrier resin as long as its excellent oxygen barrier property is not impaired.

Further, an oxygen absorbing resin layer known per se. may be included as the intermediate layer not facing the inner surface. This oxygen absorbing resin layer supplements oxygen barrier property and contains an oxidizing polymer and a transition metal-based catalyst as described in JP-A 2002-240813, and the oxidizing polymer is oxidized with oxygen by the function of the transition metal-based catalyst, whereby the oxygen absorbing resin layer absorbs oxygen to block the permeation of oxygen. Since the oxidizing polymer and the transition meta-based catalyst are detailed in JP-A 2002-240813, details thereof are omitted. Typical examples of the oxidizing polymer include olefin-based resins having a tertiary carbon atom (such as polypropylene and polybutene-1 and copolymers thereof), thermoplastic polyesters and aliphatic polyamides; xylylene group-containing polyamide resins; and ethylene-based unsaturated group-containing polymers (such as polymers derived from a polyene such as butadiene). Typical examples of the transition metal-based catalyst include inorganic salts, organic acid salts and complex salts of a transition metal such as iron, cobalt or nickel.

The gas barrier resin layer and the oxygen absorbing resin layer used as the intermediate layer should have a thickness which ensures the development of oxygen barrier property required according to the size of the bottle 10 and the type of the content. A combination of the gas barrier resin layer and the oxygen absorbing resin layer may be formed as the intermediate layer.

When the inner layer 3 has a multi-layer structure as described above and adhesion between adjacent layers is low or adhesion between the inner layer 3 and the metallic layer 1 is low, the aforementioned adhesive resin layer may be interposed between them.

In the present invention, the total thickness of the above inner layer 3 should be set to ensure that characteristic properties required for the bottle 10 are developed according to the layer structure of the inner layer 3, the type of the resin in use and the size of the bottle 10 (internal capacity).

<decorative resin layer 5>

In the present invention, as shown in FIG. 1C, the decorative resin layer 5 between the transparent resin layer 2 on the outer surface and the metallic layer 1 is formed by mixing a pigment with a transparent resin, and examples of the base transparent resin include resins enumerated for the aforementioned metallic layer 1 and transparent resin layer 2 and adhesive resins enumerated for the adhesive resin layer.

The pigment used for decoration should be different from the metal pigment to be contained in the metallic layer 1 as long as the visibility of the metallic layer 1 is not impaired, as exemplified by inorganic and organic pigments, pigments having an average thickness of more than 1 μm out of the metal pigments used for the metallic layer 1, and pearl pigments obtained by coating natural mica with titanium oxide or iron oxide.

A lubricant, modifiers and an ultraviolet absorbent may be contained in each of the layers constituting the multi-layer direct blow bottle 10 of the present invention having the aforementioned layer structure as long as the metallic appearance is not impaired.

<Production of Multi-layer Direct Blow Bottle 10>

The aforementioned multi-layer direct blow bottle 10 of the present invention is manufactured by forming a pipe-like multi-layer preform (parison) by co-extrusion using a number of extruders corresponding to the number of layers, pinching off one end of this preform, and blowing a blow fluid such as compressed air into the inside of the preform to shape the preform into a bottle form.

Since the aforementioned metal pigment is dispersed in the metallic layer 1, a resin composition prepared by mixing the metal pigment with the base resin forming the metallic layer 1 is extruded from an extruder at the time of the above extrusion molding. In the present invention, it is desired that the metal pigment should be mixed with the base resin while the base resin is plasticized. Stated more specifically, the base resin is injected into the kneading part of the extruder, the metal pigment (specifically, the metal pigment dispersed in the aforementioned dispersant) is injected and kneaded while the base resin is molten, and the kneaded product is extruded from the extruder in this state to form the metallic layer in the multi-layer preform.

By employing this means, shear force applied to the metal pigment by the screw of the extruder is alleviated effectively, thereby preventing the breakage and deformation of the metal pigment effectively at the time of extrusion molding. The metal pigment is oriented uniformly in the extrusion direction in this state and this oriented state is kept even after blowing, whereby an excellent metallic appearance is obtained stably.

For example, when the metal pigment is injected before the base resin is plasticized, shear force applied to the metal pigment by the screw of the extruder becomes large, whereby the breakage and deformation of the metal pigment tend to occur and the metallic appearance is apt to become nonuniform.

The multi-layer direct blow bottle of the present invention obtained as described above has advantages that the metallic layer for metallic decoration is obtained at the same time as molding, coating or a treatment with a decorated shrink film is not required after molding, and the bottle can be manufactured by using an existing extrusion molding machine. Therefore, an increase in cost due to metallic decoration can be avoided effectively and there is no limitation to the form of the bottle (especially the form of the barrel part) unlike the metallic decorated shrink film. Further, although the metallic layer containing the metal pigment dispersed therein is formed by extrusion molding, the breakage and deformation of the metal pigment are prevented effectively, thereby providing an excellent metallic appearance stably.

Therefore, since an increase in cost due to metallic decoration is avoided effectively, the multi-layer direct blow bottle of the present invention can be used as a package bottle for not only high price goods such as cosmetics but also low price goods such as shampoo and rinse, liquid detergents and softeners, thereby making it possible to improve the commodity value by metallic decoration.

EXAMPLES

The following examples are provided for the purpose of explaining the excellent effect of the multi-layer direct blow bottle of the present invention but are in no way to be taken as limiting.

Examples 1 to 3, Comparative Example 1

A 500 ml bottle (50 g) was formed by using the following direct blow molding machine and extruders.
Molding machine: Shuttle type molding machine manufactured by Tahara Machinery Ltd.
Extruders: first layer φ 30-FF L/D=22
  Second layer φ 30-FF L/D=22
  Third layer φ 30-FF L/D=22
  Fourth layer φ 55-FF L/D=28
  Fifth layer φ 40-FF L/D=28

The layer constitution and material of the bottle are shown below. The outer surface transparent resin layer was made of PET, and the metallic layer was formed by dispersing 2 parts by mass of an aluminum pigment into 100 parts by mass of the following linear low-density polyethylene (LLDPE).
Linear low-density polyethylene (LLDPE);
  UF230 of Japan Polyethylene Corporation. (Ziegler catalyst)

The following three different aluminum pigments were used.
Aluminum pigment A: aspect ratio of 433
Aluminum pigment B: aspect ratio of 24
Aluminum pigment C: aspect ratio of 13

The characteristic properties and the mixing ratio of the aluminum pigments are shown in Table 1 (% in the table is mass %). The average thickness of the aluminum pigment is an average value obtained by measuring 50 aluminum pigment particles selected at random with a scanning electron microscope, and the average particle diameter is represented by $D_{50}$ which is a particle diameter having a cumulative frequency of 50% in a volume-based cumulative particle size distribution curve obtained by measuring with a laser diffraction type particle size distribution measuring device.
Layer constitution: five different layers
(outer side) PET/AD/(metallic layer) LLDPE+aluminum pigments/HDPE/HDPE (inner side)
(outer side) 5/7/10/68/10 (unit: μm) (inner side) Material;
Polyethylene terephthalate (PET): GN001 of EASTMAN LEATHER CLO. & MASH CO.
Adhesive resin (AD): F512A of Mitsubishi Chemical Corporation
Linear low-density polyethylene (LLDPE): UF230 of Japan Polyethylene Corporation
High-density polyethylene (HDPE): HI-ZEX6700B of Prime Polymer Co., Ltd.

The results of visual evaluation of brightness (metallic appearance) are shown in Table 1.
⊚ excellent, ○ satisfactory, Δ acceptable, X unacceptable Example 4

A 500 ml bottle was formed in the same manner as in Examples 1 to 3 except that the mixing ratio (A:B) of the aluminum pigments A and B for the metallic layer was changed to 20:80 (mass %). The result of visual evaluation of brightness (metallic appearance) is shown in Table 1.

Examples 5 to 7

A 500 ml bottle was formed in the same manner as in Examples 1 to 3 except that the mixing ratio (A:B) of the aluminum pigments A and B for the metallic layer was changed to 30:70 (mass %) and the total content of the aluminum pigments based on 100 parts by mass of LLDPE was changed as shown in Table 1. The results of visual evaluation of brightness (metallic appearance) are shown in Table 1.

Example 8

A 500 ml bottle was formed in the same manner as in Examples 1 to 3 except that the base resin and the aluminum pigment of the metallic layer were changed as follows. The result of visual evaluation of brightness (metallic appearance) is shown in Table 1.
Base Resin;
  Metallocene-catalized linear low-density polyethylene: EXCELENExcelene GH052 (metallocene-catalyzed) of Sumitomo Chemical Co., Ltd.
Aluminum pigment D: aspect ratio of 37

TABLE 1

| | Content of metal pigment in metallic layer | Aluminum pigment | | Evaluation Brightness |
|---|---|---|---|---|
| | | Average thickness/average particle diameter | Mixing ratio | |
| Ex. 1 | 2 parts by mass | A: 30 nm/13 μm | A: 100% | ⊚ |
| Ex. 2 | 2 parts by mass | A: 30 nm/13 μm B: 500 nm/12 μm | A: 50% B: 50% | ○ |
| Ex. 3 | 2 parts by mass | B: 500 nm/12 μm | B: 100% | Δ |
| Ex. 4 | 2 parts by mass | A: 30 nm/13 μm B: 500 nm/12 μm | A: 20% B: 80% | ○ |
| Ex. 5 | 10 parts by mass | A: 30 nm/13 μm B: 500 nm/12 μm | A: 30% B: 70% | ⊚ |
| Ex. 6 | 25 parts by mass | A: 30 nm/13 μm B: 500 nm/12 μm | A: 30% B: 70% | ○ |
| Ex. 7 | 35 parts by mass | A: 30 nm/13 μm B: 500 nm/12 μm | A: 30% B: 70% | Δ |
| Ex. 8 | 2 parts by mass | D: 300 nm/11 μm | D: 100% | ⊚ |
| Comp. Ex. 1 | 2 parts by mass | C: 1.5 μm/20 μm | C: 100% | X |

EXPLANATION OF REFERENCE NUMERALS

1: metallic layer
2: transparent resin layer
3: inner layer
5: decorative resin layer
10: multi-layer direct blow bottle
The invention claimed is:
1. A multi-layer direct blow bottle wherein a metallic layer containing a metal pigment having an average thickness of not more than 1 μm dispersed in a resin is formed at a position where it is visible from an outer surface side, and wherein at least 20 mass % of the metal pigment has a thickness of not more than 100 nm.

2. The multi-layer direct blow bottle as claimed in claim 1, wherein the metallic layer is formed on an outer surface layer or under an outer surface transparent resin layer.

3. The multi-layer direct blow bottle as claimed in claim 1, wherein the metal pigment is dispersed in an amount of 0.5 to 30.0 parts by mass based on 100 parts by mass of the resin in the metallic layer.

4. The multi-layer direct blow bottle as claimed in claim 1, wherein the resin is metallocene-catalized linear low-density polyethylene.

5. The multi-layer direct blow bottle as claimed in claim 1, wherein the metal pigment is an aluminum pigment.

6. A process for producing the multi-layer direct blow bottle as claimed in claim 1, the process comprising the steps of:
   forming a tube-like preform by coextrusion of a resin composition comprising the metal pigment having an average thickness of not more than 1 μm dispersed therein; and
   blowing a blow fluid while one end of the preform is closed to shape the preform into a bottle form,
   wherein the resin composition comprising the metal pigment dispersed therein is prepared by mixing the metal pigment after the resin is plasticized.

* * * * *